United States Patent
Iyoki

(10) Patent No.: US 6,580,852 B2
(45) Date of Patent: Jun. 17, 2003

(54) OPTICAL FIBER PROBE AND CANTILEVER WITH MICROSCOPIC APERTURE, AND METHOD OF FORMING MICROSCOPIC OPENINGS

(75) Inventor: Masoto Iyoki, Chiba (JP)

(73) Assignee: Seiko Instruments Inc. (JP)

( * ) Notice: Subject to any disclaimer, the term of this patent is extended or adjusted under 35 U.S.C. 154(b) by 146 days.

(21) Appl. No.: 09/765,548

(22) Filed: Jan. 19, 2001

(65) Prior Publication Data

US 2002/0076184 A1 Jun. 20, 2002

(30) Foreign Application Priority Data

Jan. 26, 2000 (JP) .......................... 2000-016806

(51) Int. Cl.[7] .............. G02B 6/26; G02B 6/00; B26F 3/00
(52) U.S. Cl. .................. 385/31; 385/147; 385/12; 225/1; 225/2
(58) Field of Search .................. 385/31, 147, 12; 225/1, 2

(56) References Cited

U.S. PATENT DOCUMENTS

| | | | |
|---|---|---|---|
| 5,664,036 A | * | 9/1997 | Islam .................... 250/306 |
| 5,677,978 A | * | 10/1997 | Lewis et al. ............ 385/125 |
| 5,960,147 A | * | 9/1999 | Muramatsu et al. ...... 250/306 |
| 6,104,030 A | * | 8/2000 | Chiba et al. ............ 250/306 |
| 6,370,306 B1 | * | 4/2002 | Sato et al. ............... 385/12 |
| 6,388,239 B1 | * | 5/2002 | Muramatsu ............ 250/201.3 |
| 6,408,123 B1 | * | 6/2002 | Kuroda et al. .......... 359/368 |
| 6,430,324 B1 | * | 8/2002 | Muramatsu et al. ....... 385/12 |

* cited by examiner

Primary Examiner—Georgia Epps
Assistant Examiner—Jack Dinh
(74) Attorney, Agent, or Firm—Adams & Wilks

(57) ABSTRACT

A method of forming an aperture in an optical fiber probe comprising the steps of sharpening the tip and bending the tip section of the optical fiber probe relative to a longitudinal axis, covering a portion of the probe with a metallic film, positioning the probe relative to a surface of a sample, effecting relative movement between the probe and the surface of the sample so that the probe is disposed in a region where an atomic force acts between the probe and the surface of the sample, measuring and monitoring a displacement of the probe resulting from the atomic force acting between the tip of the probe and the surface of the sample, using a pressing force from the atomic force to plastically deform or break the tip section of the probe to form an aperture in the tip section having a diameter obtained in accordance with a measured value of the displacement of the probe.

27 Claims, 10 Drawing Sheets

FIG.15A1
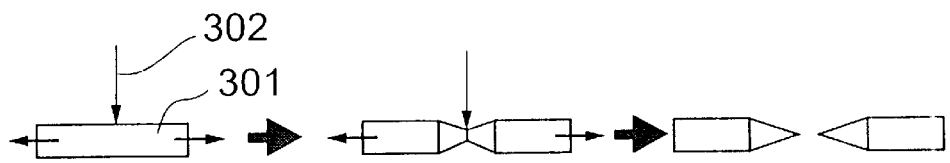
FIG.15A2
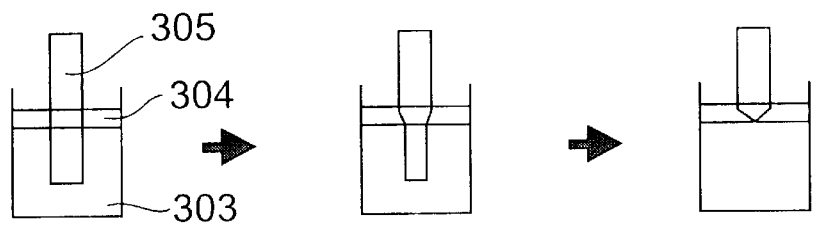
FIG.15B
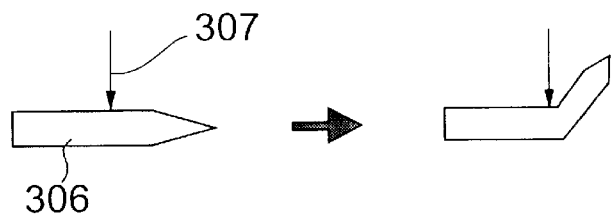
FIG.15C
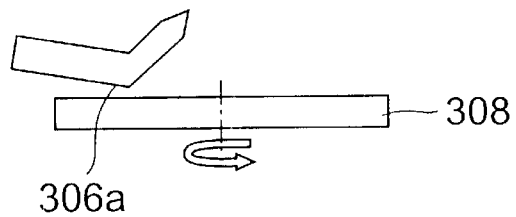
FIG.15D
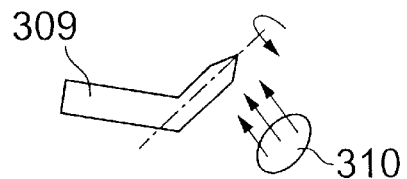

OPTICAL FIBER PROBE AND CANTILEVER WITH MICROSCOPIC APERTURE, AND METHOD OF FORMING MICROSCOPIC OPENINGS

BACKGROUND OF THE INVENTION

1. Field of the invention

The present invention relates to an optical fiber probe and cantilever. having a microscopic aperture, used in a scanning near-field microscope, and to a method of forming this aperture.

2. Description of the Prior Art

An optical fiber probe of a scanning near-field microscope of the related art is manufactured using the type of method described below (1) Tip sharpening step
  ① Hot pulling method: heat is applied to the optical fiber probe, etc., and the optical fiber is pulled in an axial direction to sharpen the tip.
  ② Etching method: the optical probe is immersed in etching fluid, and the tip is sharpened under predetermined etching conditions.

(2) Aperture forming step
  ① Oblique vapor deposition method: an aperture section of the extreme tip section of the sharpened probe are left behind, and a metal is vapor deposited from an oblique direction so that sections other than the aperture are covered with a metallic film.
  ② Pressing method: After a metallic film has been vapor deposited on a section including a tip section, the tip section is pressed against a sample surface to form an aperture. With this method, the probe is brought into contact with a detector surface made of silicon utilizing shear force, while carrying out distance regulation, and after contact the tip is broken using an external. impulsive force etc. while monitoring the detector output, until a desired output is obtained.

Also, in the case where a bent type optical fiber probe is processed, a bending step is carried out between the steps (1) and (2) described above. In the bending step laser light is applied to the sharpened probe, and the optical fiber is softened by the thermal effect. At this time, the probe is bent by a surface tension effect of the softened optical fiber material.

The manufacturing steps as described above are disclosed, for example, in the near-field nanophotonics handbook, 23–28 and 42–48, optronics society. Also, the method of forming an aperture by pressing an optical fiber probe is described in a "fiber probe aperture control method for near-field light microscope" by Teruyama and Saiki, 46th lectures of the applied physics association, 1030.

On the other hand, with a scanning near-field microscope, a cantilever with a microscopic aperture is also used (for example, H.Zhou, A.Midha, L.Bruchhaus, G.Mills, L.Donaldson, and J. M. R.Weaver: Novel SNOM/AFM Probes by combined Micromachining and Electron-Beam Nanolithography, Preliminary Proceedings of STM '99, 459). A cantilever with a microscopic aperture has a cantilever section and a probe formed of a silicon nitride or silicon material using a semiconductor process, a microscopic aperture is provided in the probe tip, and the microscopic aperture is made into a through hole so that a beam is focused by an objective lens onto a rear surface of the cantilever, passed through the through holes and a laser beam is introduced. The tip section is also covered with a metallic film in the cantilever having a microscopic aperture.

However, with the aperture forming method of the related art, there are the following problems.

(1) In the case of the oblique vapor deposition method, in order to make an aperture with good reproducibility, it is necessary to optimize vapor deposition conditions. This optimization requires time, and also, in the case where the probe shape is altered, it is necessary to carry out the optimization again. Further, it is not possible to avoid variations in aperture diameter, even after optimization. Once the aperture have been formed, it is impossible to correct them and defective products must be discarded.

(2) In the case of the pressing method, light output is being monitored at the tome of forming the aperture, which means that thee is the advantage that a desired aperture can be obtained. However, with the method of the related art, it is difficult to regulate the pressing force, and fine adjustment of the aperture diameter is difficult. Because of this, it is often the case that the aperture diameter becomes bigger than a desired diameter because the pressing force is to large, or the tip is damaged and the shape of the aperture becomes elliptical.

In order to solve these problems in the related art, an object of the present invention is therefore to provide an optical fiber probe and a cantilever having a microscopic aperture, capable of obtaining an aperture of a desired diameter with good reproducibility, and finely adjusting a force for plastic deformation or breaking of a tip, and a method of forming this aperture.

SUMMARY OF THE INVENTION

In order to solve the foregoing problems in the conventional art, the optical fiber probe and cantilever with a microscopic aperture of the present invention includes means for bringing a probe tip and a sample close together or into contact with each other utilizing an atomic force or shear force acting between the optical fiber probe or the. probe tip of the cantilever with a microscopic aperture, or a tunnel current or evanescent light, regulating a force on the probe tip with a physical amount of any of these as a parameter, and forming an aperture of a desired diameter at the tip section by plastic deformation or breaking of the tip section of the probe using a force received from a sample surface.

BRIEF DESCRIPTION OF THE DRAWINGS

FIG. 15 is a schematic diagram for describing an optical fiber probe production method used in the present invention.

DETAILED DESCRIPTION OF THE PREFERRED EMBODIMENTS

The principal of the structure of and operation of the present invention will be described.

In the following, the principal of operation of regulating a force on the probe tip will be described for each parameter.

(1) When using atomic force (contact mode)

Figure 8A:
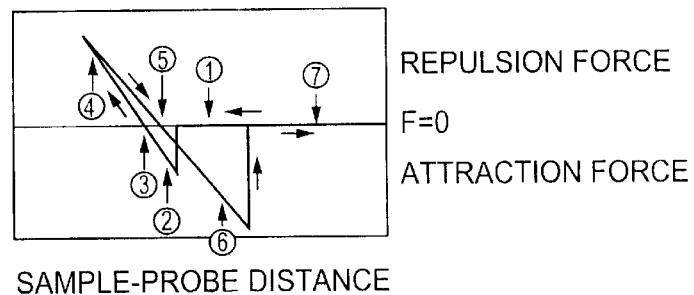
FIG. 8 is a force curve and a state diagram of contact mode ATM regulation.
Figure 8B:
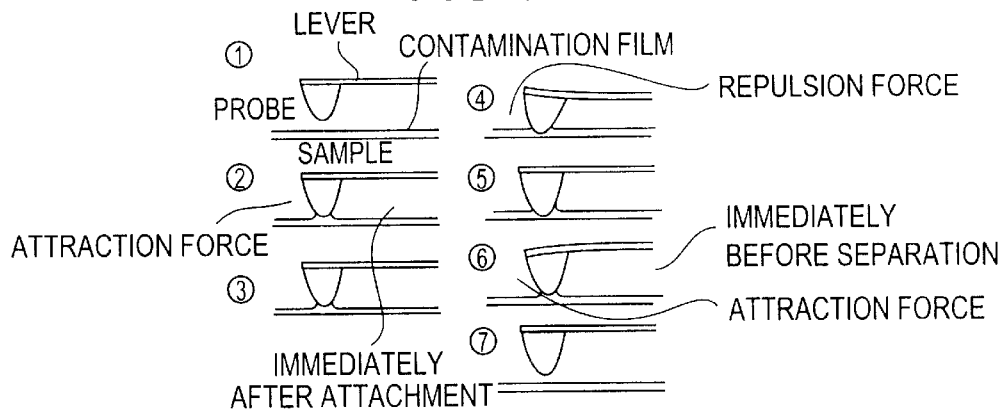

This method uses the principle of a contact mode atomic force microscope (hereafter referred to as a contact mode AFM) using a bent type optical fiber probe and a cantilever with a microscopic aperture. FIG. 8($a$) shows a force curve in the case of the probe and the sample being brought into contact with each other, and FIG. 8($b$) is a drawing showing conditions between the probe and the sample corresponding to numbers in the force curve of FIG. 8($a$). In FIG. 8($a$), the horizontal axis represents a distance the sample has moved, and if it moves to the left, the sample approaches the probe. The vertical axis represents an amount of bending of the cantilever, with the upper side being a cantilever repulsion force acting, and the lower side being a cantilever attraction force acting.

With a general contact mode AFM, an amount of bending of the cantilever is set, and a distance between the probe and the sample is feedback regulated so that the amount of bending is constant. The amount of bending is made to correspond to the force on the probe tip using hook's rule. Accordingly, by varying the bending amount parameter, as is clear from the force curve of FIG. 8($a$), the force on the probe tip inside a near field region where atomic force acts can be finely adjusted.

Here, if the sample is a planar surface and the probe tip is flexible and a sphere having a radius of curvature R, then a relationship between a contact surface area A of the probe tip and a pressing force F on the probe tip is established as $A=KF^{2/3} R^{2/3}$ (K is a constant) using the Hertz theory of elastic contact. At this time, if the tip is subjected to plastic deformation or breaking, a microscopic aperture having an aperture surface area of about A are formed. That is, an aperture having a desired diameter are formed by the pressing force.

(2) When using atomic force (dynamic mode)

Figure 9:
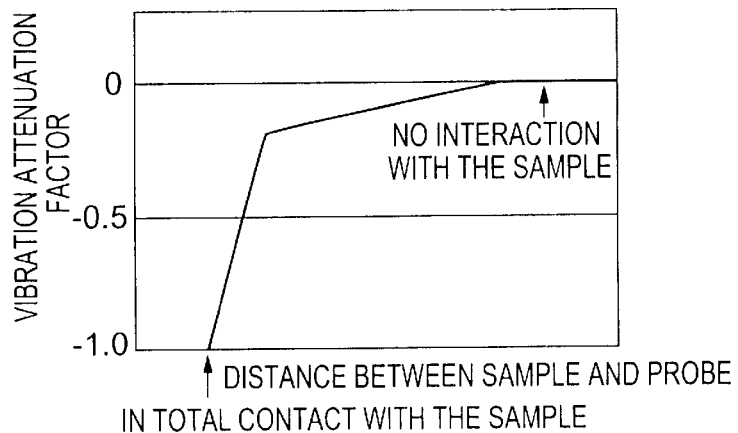
FIG. 9 is a force curve of dynamic mode ATM regulation.

This method also uses the principle of a dynamic mode atomic force microscope (hereafter referred to as a dynamic mode AFM) using a bent type optical fiber probe and a cantilever with a microscopic aperture. FIG. 9 shows a force curve in the case of bringing a probe close to a sample while vibrating the probe in a vertical direction within a plane orthogonal to the sample surface. The horizontal axis represents a distance between the probe and the sample, and movement to the left is when the sample and the probe are brought close together. The vertical axis represents an vibration attenuation factor with respect to an initial vibration amount of the cantilever, and when this is 0 the cantilever maintains a freely oscillating state with no attenuation, and when it is enters the negative side an external force acts on the probe and attenuation occurs. Here, of external forces causing vibration attenuation, one having the highest contribution factor is an atomic force when the probe and the sample are moved apart, but is an intermittent contact force to the sample surface when the probe and the sample are moved closer together.

With a general dynamic mode AFM, the vibration attenuation factor is set, and the distance between the probe and the sample is feedback regulated so as to maintain vibration reduced by a constant amount from an initial vibration state. This attenuation factor corresponds to pressing force on the probe tip. Accordingly, by varying the attenuation factor parameters it is possible to finely adjust force on the probe tip within a near-field region where atomic force acts, as is clear from the force curve of FIG. 9.

A microscopic aperture having a desired diameter is formed by subjecting the probe tip to plastic deformation or breaking with the pressing force on the probe tip.

With the dynamic AFM, it is also possible to take advantage of feedback using variation in phase of the cantilever, instead of the attenuation factor of the vibration. That is, if the distance between the probe and the sample is closed while exciting the cantilever at close to the resonant frequency, phase of vibration of the cantilever is varied by the external force acting on the probe tip. If the amount of variation in phase is set, it is possible to control the pressing force on the probe. tip in the same way as in when attenuation factor is a parameter, and as a result, an aperture having a desired diameter is formed by plastic deformation or breakage of the tip.

(3) When using shear force

Figure 10:
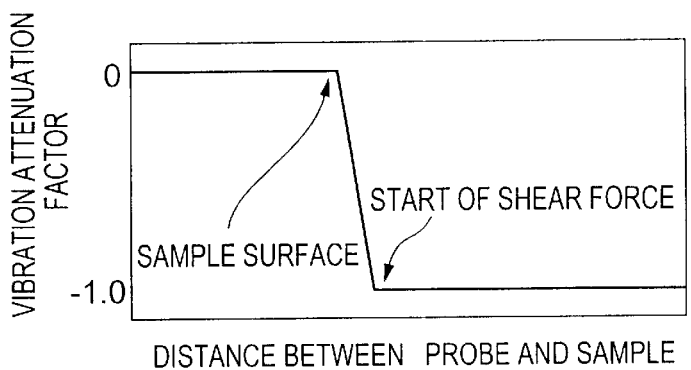
FIG. 10 is a force curve of shear force regulation.

This method is mainly used with straight type optical fiber probes. It is also possible to apply this method to bent type optical fiber probes and cantilevers with a microscopic aperture. Here, in the case of a straight type optical fiber probe, an amount of vibration of the probe is monitored, while in the case of a bent type optical fiber probe or a cantilever having a microscopic aperture a twisting angle is monitored. FIG. 10 shows a force curve in the case of bringing a probe and a sample together while vibrating the probe within a plane parallel to the sample surface. The horizontal axis represents a distance between the sample and the probe, with movement to the left being a condition of the probe and the sample approaching each other. The vertical axis represents a vibration attenuation factor compared to an initial vibration state of the optical fiber probe (or compared to vibration of the twisting angle in the case of a bent type optical fiber probe or a cantilever having a microscopic aperture), with 0 being a condition where a free vibration state is maintained and there is no vibration attenuation, while the negative side indicates that an external force is acting on the probe and vibration attenuation is occurring. Here, the external force causing vibration attenuation can be attributed to capillary force due to adsorbed water on the sample surface, frictional force between the probe and the sample, or an atomic force etc.

With shear force regulation, a vibration attenuation factor is set, and a distance between the probe and the sample is feedback controlled so that vibration is held at an amplitude attenuated by a fixed amount from an initial state of oscillation. This attenuation factor corresponds to force acting on the probe tip. Components of this force are a shear force acting in the direction of vibration, the vibration force, and a pressing force acting in the vertical direction. As clearly shown in the force curve of FIG. 10, by varying the attenuation factor parameter it becomes possible to finely adjust the shear force on the probe tip within a near field region where the shear force acts, and the pressing force is also varied by change in the distance between the sample and the probe. A microscopic aperture having a desired diameter is formed by plastic deformation or breakage of the probe tip using these forces.

In the case of shear force regulation, similarly to the dynamic mode AFM, instead of the vibration attenuation factor it is also possible to employ feedback using phase variation of the optical fiber probe or the cantilever having a microscopic aperture. Specifically, in the case of making a distance between the probe and the sample closer while exciting the optical fiber probe or the cantilever having a microscopic aperture close to the resonant frequency, phase of the vibration of the probe varies due to external force acting on the probe tip. If the amount of this phase variation is set, then similarly to the case where the attenuation factor is a parameter, it is possible to control the shear force and the pressing force on the probe tip, and as a result an aperture having a desired diameter is formed by plastic deformation or breakage of the tip.

(4) When using tunnel current

Figure 11:
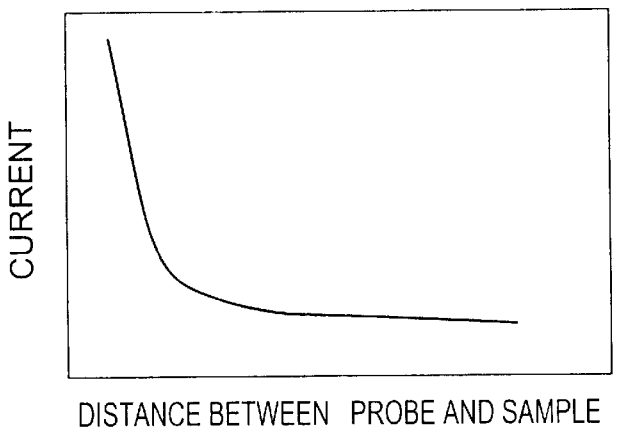
FIG. 11 is a graph showing a relationship between probe—sample distance and current value for STM regulation.

This method utilizes a scanning tunnel microscope (hereafter referred to as an STM) that uses straight type and bent type optical fiber probes having a conductive thin film formed on a tip and a cantilever having a microscopic aperture. FIG. 11 shows a relationship between a distance between a sample and a probe and a tunnel current value for conditions of a bias voltage applied between the probe and the sample. The horizontal axis represents the distance between the probe and the sample, with movement to the left indicating the probe and the sample being brought together. The vertical axis represents a tunnel current value.

With STM control, a tunnel current value is set, and a distance between the probe and the sample is regulated so that the tunnel current value is held constant. If the distance between the probe and the sample is closed with the tunnel current value as a parameter, pressing force is produced on the probe tip by the interaction of atomic force, an absorption layer of the sample surface, a contamination layer etc. This pressing force increases as the distance between the probe and the sample becomes closer. Accordingly, as shown clearly in FIG. 11, by varying the tunnel current value parameter, the probe and the sample are brought close together and it becomes possible to finely adjust a pressing force on the probe tip within a near field region where the tunnel current is effective. A microscopic aperture having a desired diameter is formed by plastic deformation or breakage of the tip with this pressing force.

(5) When using Evanescent light

This method is used with straight and bent type optical fiber probes, and with cantilevers having a microscopic aperture. Method of performing evanescent light regulation cab be classified into ① methods for forming evanescent light on the sample surface, and ② methods of forming evanescent light on the probe tip.

① Methods for forming evanescent light on the sample side surface

Figure 12:
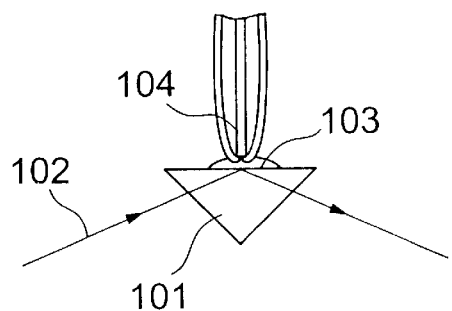
FIG. 12 is a schematic diagram for describing an evanescent light regulation method.
Figure 14:
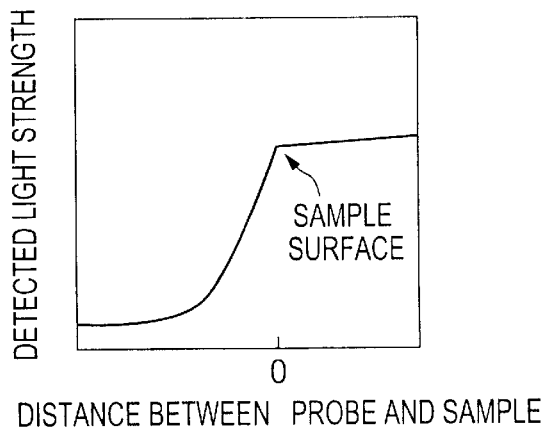
FIG. 14 is a graph showing a relationship between probe—sample distance and evanescent light intensity for evanescent light regulation.
Figure 16A:
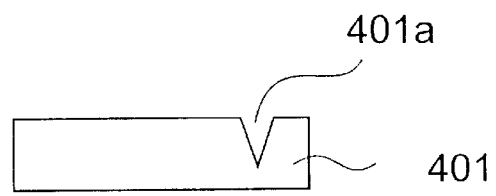
FIG. 16 is a schematic diagram for describing an cantilever production method used in the present invention.
Figure 16B:
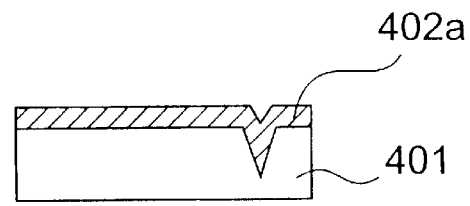
Figure 16C:
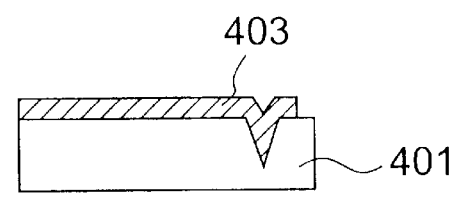
Figure 16D:
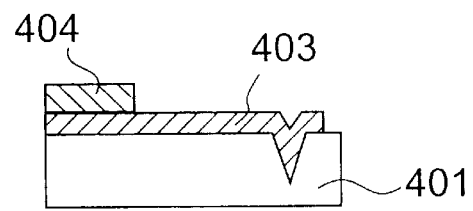
Figure 16E:
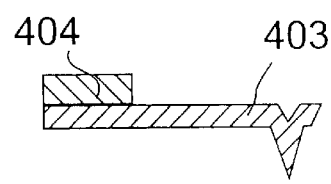

As shown in FIG. 12, in the case where light 102 is injected from a reverse side of a transparent sample 101 formed from a prism under total reflection conditions, an evanescent field 103 is formed at the sample surface. If a probe 104 is bright close to this evanescent field, evanescent light is scattered and converted to propagated light. The evanescent light strength is dependent on the distance from the sample surface. FIG. 14 shown a relationship between a probe—sample distance and scattering light intensity at this time. In FIG. 14, the horizontal axis represents a distance between the probe and the sample, with movement to the right being the condition where the probe and the sample are brought closer together. As will be understood from FIG. 14, the light intensity increases as the sample surface is approached. Accordingly, regulation of the distance between the probe and the sample becomes possible using the intensity of light scattered at the probe tip. If fine adjustment of the distance between the probe and the sample is made possible, an aperture is formed by plastic deformation or breakage of the tip, similarly to the case for STM regulation.

② methods of forming evanescent light on the probe tip

Figure 13:
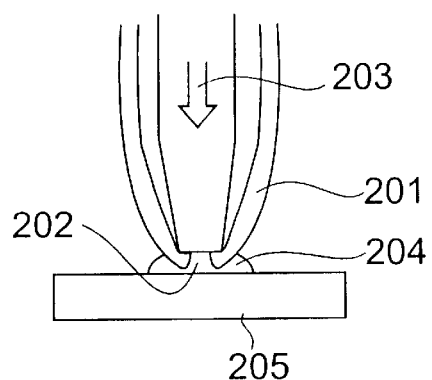
FIG. 13 is a schematic diagram for describing an evanescent light regulation method.

As shown in FIG. 13, an aperture 202 that is smaller than a desired aperture is formed in advance on a tip of a probe 201, and if light 203 is introduced into the aperture and evanescent field is formed in the probe tip (namely, the size of the aperture is smaller than the wavelength). In this state, if the probe 201 and the sample 205 are brought closer together, evanescent light is scattered at the sample surface and converted to propagation light. The evanescent light intensity is dependent on the distance from the aperture, and as shown in FIG. 14, light intensity increases as the sample surface is approached. Accordingly, it becomes possible to regulate the distance between the probe and the sample using the intensity of light scattered at the probe tip. If fine adjustment of the distance between the probe and the sample is made possible, an aperture is formed by plastic deformation or breakage of the probe tip, similarly to the case for STM regulation.

In this method, in the state where the aperture is blocked off, after formation of an aperture by plastic deformation or breakage of the tip by bringing the probe into contact with the sample control is performed using the evanescent light from that aperture and it is possible to produce an aperture having the desired diameter.

Embodiments of the present invention will now be described in the following, based on the drawings.

FIG. 15 shows manufacturing processes up to before aperture formation using an optical fiber probe pressing method used in present invention.

① Sharpening Process

Various methods have been proposed as processes for sharpening an optical fiber, but here a description will be given of a hot pulling method and an etching method as representative methods.

A optical fiber sharpening process using the hot pulling method is shown in FIG. 15(a1). In the case of the hot pulling method, a laser beam 302 of a CO2 laser or the like is converged on an optical fiber 301 with tension on the optical fiber 301. At this time, energy of the laser light is converted to heat energy at converged section, and localized fusion occurs. At this time, if more tension continues to be applied from the two ends of the optical fiber, the optical fiber is stretched to a pencil shape and finally ruptures. The shape of the rupture surface and the taper angle are adjusted by the intensity of the laser beam irradiated and the irradiation surface area and magnitude of the tension.

Next, a description will be given of 2-phase etching, which is a typical example of a processes for sharpening using an etching method. As shown in FIG. 15(a2), in the 2-phase etching process high concentration hydrofluoric acid solution 303 is used as etching fluid, and in order to prevent variations in concentration due to vaporization of the hydrofluoric acid, and to make the probe surface smooth at an interface, an organic solvent (heptane) 304 is deployed on the hydrofluoric acid solution, to give 2-phase conditions, and etching is carried out inside the hydrofluoric acid solution lower down than an interface between the two. The material of an optical fiber 305 is $SiO_2$ doped with $GeO_2$ for the core, and $SiO_2$ as the cladding.

A ratio of the etching rates of the core and the cladding is varied by varying the mixing ratio of the etching fluid (mixing ratio of NH4F(50 weight %):HF(50 weight %):$H_2O$) at this time, making it possible to control the taper shape and thickness of the taper section.

The present invention is not limited to the above described hot pulling method and etching methods, and all generally used sharpening processes are included in the present invention.

② Bending Process (Bent Type Only)

A bending process for a bent type optical fiber probe is shown in FIG. 15(b). When making a bent type optical fiber probe, a laser beam 307 if a $CO_2$ laser or the like is condensed on the area around a tip of the sharpened optical fiber probe 306. At the sections where the light is condensed $SiO_2$ is softened by the effect of heat energy, and the probe is bent by a difference in surface tension between the side where the laser beamed is condensed and the reverse side.

When the bent type probe is used in AFM control, laser light strikes a normal probe back face and displacement of the probe is detected using an optical lever method. In order to produce a reflection surface for this laser light, as shown in FIG. 15(c), a rear surface 306a of the probe is mechanically ground by a grindstone 308.

③ Film Attaching Process

In order to produce a microscopic aperture in the tip of an optical fiber probe with the method as shown in FIG. 15(d), an Al film is vapor deposited.

The sharpened optical fiber 309 is fixed in a vacuum evaporator, and Al is vapor deposited. At this time, the angle of attaching the probe with respect to the vapor deposition source 310 is set so that Al is not vapor deposited in the tip section, and the optical fiber probe is rotated to vapor deposit Al to the circumference of the tip section. Since the tip aperture section will be extended by force in a subsequent process, it is not necessary to make the aperture properly at this stage, and as long as the size of the aperture is smaller than the desired aperture diameter, there is no problem if part or all of the aperture is blocked up with a metallic film.

Here, the metal used in film attaching is not limited to Al, and it is also possible to use a material such as Au or Cr etc. The film attaching method is also not limited to this method.

Next, manufacturing processes before formation of the aperture using a method of pressing the cantilever having a microscopic aperture will be shown.

① Step of Manufacturing Cantilever with Probe Attached

Various methods are used for manufacturing a cantilever with a probe attached, but here an embodiment of a method of manufacturing a silicon nitride type cantilever, which is a typical example, will be described.

A method of manufacturing a silicon nitride film type cantilever used in the present invention is shown in FIG. 16. As shown in FIG. 16(a), a square cone shaped hole 401a defining the shape of a probe section of the cantilever is formed on a silicon substrate 402. Next, as shown in FIG. 16(b), a silicon nitride type film 402 for producing the cantilever and the probe section is deposited on the silicon substrate. Next, as shown in FIG. 16(c), this silicon nitride film is formed into a cantilever pattern 403 by selective etching in the shape of the cantilever. As shown in FIG. 16(d), a support section 404 is then connected to the end of the cantilever. Finally, as shown in FIG. 16(e), the silicon substrate 401 is removed by etching and the cantilever is produced.

Figure 17A:
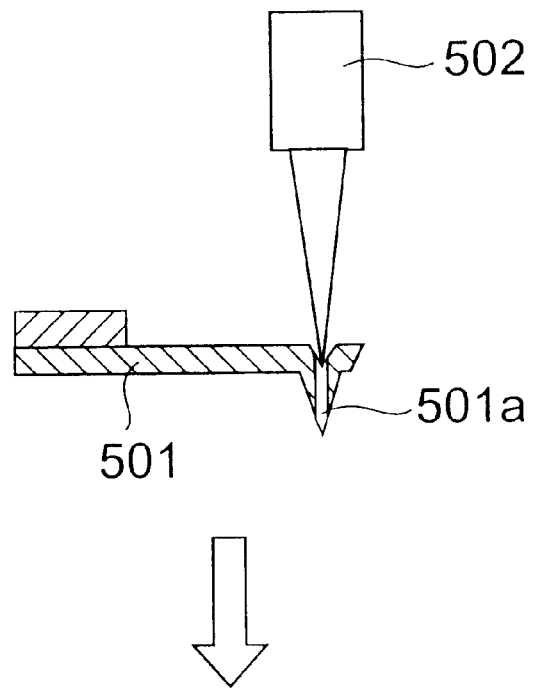
FIG. 17 is a schematic diagram for describing an aperture forming method for a cantilever having a microscopic aperture used in the present invention.

Besides this embodiment, as a cantilever it is also possible to use other forms of cantilever such as a cantilever made of a silicon film or a silicon oxide film, and all are included in the present invention ② Hole Drilling Process Drilling of a hole in the cantilever 501 used in the present invention involves hanging the probe tip from a rear surface side of the cantilever, as shown in FIG. 17(a), and forming a through hole 501a through the probe tip along a longitudinal axis thereof disposed generally orthogonal to a longitudinal axis of the cantilever 501 using a focussed ion beam (FIB) 502. The hole diameter at this time can be any size, but in this embodiment the diameter is made φ100 nm. The hole drilling process is not limited to FIB processing, and the present invention also includes methods such as electron beam processing or laser processing.

③ Film Attaching Process

Figure 17B:
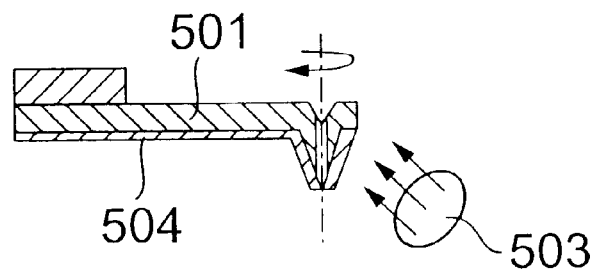

As shown in FIG. 17(b), the cantilever in which a hole has been drilled is fixed in a vacuum evaporator, and an Al film 504 is vapor deposited. An attachment angle of the cantilever 501 with respect to the evaporation source 503 at this time is set so that Al is not vapor deposited on the tip section. In the case of the cantilever also, similarly to the optical fiber probe, since the tip aperture is flared out in a subsequent process, there is no need to strictly manufacture the aperture, and as long as the size of the aperture is smaller than the desired aperture diameter, there is no problem if part or all of the aperture section is blocked up with metallic film. The metal used for film attachment is not limited to Al, and any material such as Au or Cr can be used.

Next, description will be given of a process of forming an aperture using a pressing method.

Figure 1:
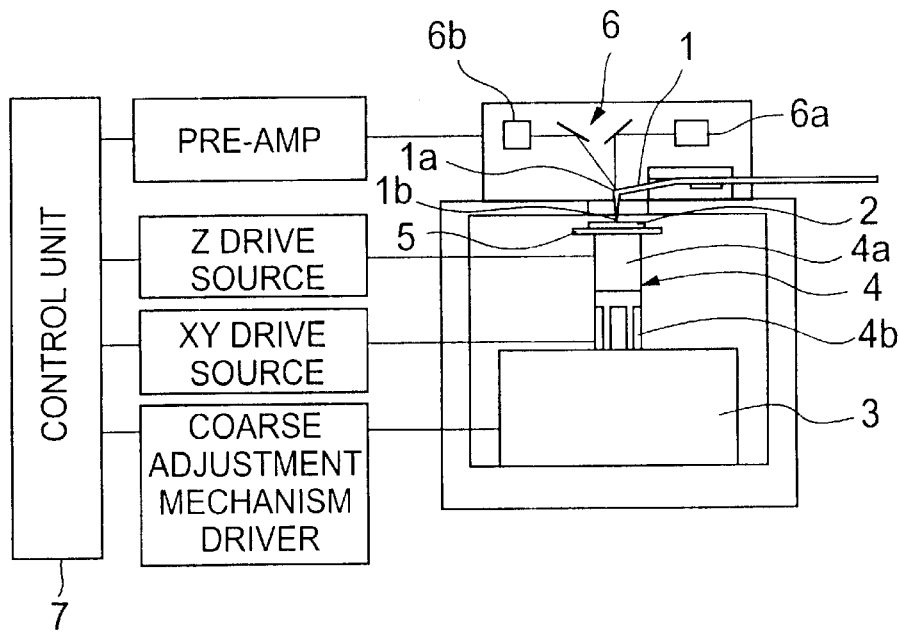
FIG. 1 is a schematic diagram of an apparatus for forming an aperture in a tip of a bent type optical fiber probe using a contact mode AFM regulation method, being a first embodiment of the present invention.

FIG. 1 is a schematic diagram of an apparatus for forming an aperture in a tip of a bent type optical fiber probe using a contact mode AFM, being a first embodiment of the present invention.

This apparatus comprises a coarse adjustment mechanism 3 for bringing a sample 2 close to a probe 1, a Z fine adjustment mechanism 4a for finely adjusting a distance between the sample 2 and the probe 1, an XY fine adjustment mechanism 4b for scanning the sample 2 within a two-dimensional plane, a sample holder 5 for mounting a sample, a probe holder 5 for fixing the probe 1, a displacement detection unit 6 for measuring an amount of displacement of the probe, and a control unit 7 for carrying out control of the overall system. Here, the coarse adjustment mechanism 3 uses a method for driving a feed screw with a motor, while the XY and Z fine adjustment mechanisms use a cylindrical piezoelectric element 4. Also, displacement detection means applies a semiconductor laser 6a to a reflection surface 1a provided on a rear surface of the probe, and uses an optical head of an optical lever method for carrying out measurement of an amount of displacement of the probe using a four-piece detector 6b.

In a state where an aperture section 1b of a bent type optical probe is pre-coated with an Al metal film and is almost completely blocked up, only a pin-hole that is smaller than the finally required fine aperture diameter (here $\phi$50 nm) remains.

Using this apparatus, the sample 2 is brought closer to the probe 1 using the coarse adjustment mechanism 3 while monitoring an amount of bending of the bent type optical fiber probe 1. The sample 2 is brought up to a region where an atomic acts between the probe 1 and the sample 2, and if the amount of bending becomes a previously set amount the coarse adjustment mechanism 3 is stopped, and feedback is carried out using the Z fine adjustment mechanism 4a so that this amount of bending becomes constant. A pressing force received by the probe tip at an initial value for this amount of bending is a force that will not break the tip. After that, a bending amount parameter of the control unit is changed, and the distance between the sample and the probe is made gradually closer using the Z fine adjustment mechanism 4a, increasing the pressing force on the tip, thus breaking the tip and forming the aperture. In this embodiment, since a relationship between the aperture diameter and the bending amount is quantified in advance through experimentation, it is possible to form an aperture having any diameter by setting the bending amount.

The method of using the bending amount as a parameter in this method can also be applied to a cantilever having a microscopic aperture.

Figure 2:
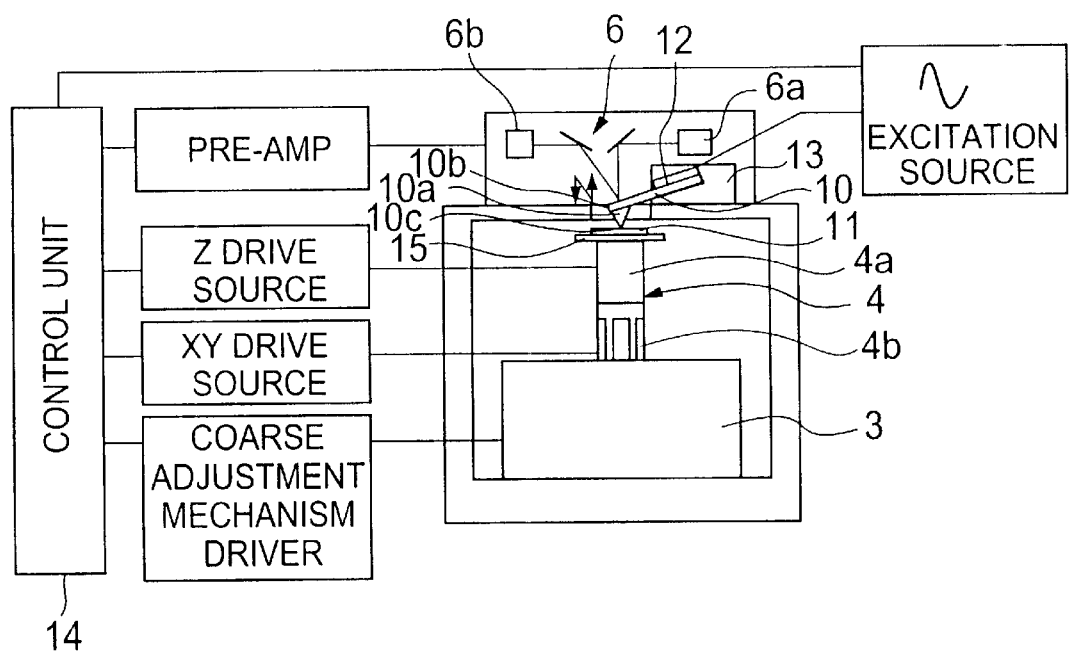
FIG. 2 is a schematic diagram of an apparatus for forming an aperture in a tip of a cantilever having a microscopic aperture using a dynamic mode AFM regulation method, being a second embodiment of the present invention.

FIG. 2 is a schematic diagram of an apparatus for forming an aperture in a tip of a cantilever having a microscopic aperture using dynamic mode AFM, being a second embodiment of the present invention.

This apparatus comprises a coarse adjustment mechanism 3 for bringing a sample 11 close to a probe 10a, a Z fine adjustment mechanism 4a for finely adjusting a distance between the sample 11 and the probe 10a, an XY fine adjustment mechanism 4b for scanning the sample 1 within a two-dimensional plane, a sample holder 15 for mounting the sample 1, a cantilever holder 13 having a piezoelectric element 12 for vibrating the cantilever attached, a vibration detection unit 6 for measuring an amount of vibration of the cantilever, and a control unit 14 for carrying out control of the overall system. Here, the coarse adjustment mechanism 3 uses a method for driving a feed screw with a motor, while the XY and Z fine adjustment mechanisms use a cylindrical piezoelectric element 4. Also, vibration detection means applies a semiconductor laser 6a to a reflection surface 10b provided on a rear surface of the cantilever, and uses an optical head 6 of an optical lever method for carrying out measurement of an amount of vibration of the cantilever using a four-piece detector 6b.

The cantilever having a microscopic aperture 10 has a hole formed in advance in the probe section by FIB processing, but the tip aperture section 10c is initially blocked up with an Al metallic film.

Using this apparatus, the cantilever 10 is vibrated at close to the resonant frequency and the sample 11 is brought closer to the probe 10a by the coarse adjustment mechanism 3 while monitoring an amount of vibration. The sample 11 is brought up to a region where an atomic acts between the probe 10a and the sample 11, and if the vibration is attenuated to a previously set amount the coarse adjustment mechanism 3 is stopped, and feedback is carried out using the Z fine adjustment mechanism 4a so that this amount of vibration becomes constant. A pressing force received by the probe tip at an initial value for this amount of vibration is a force that will not break the tip. After that, a vibration attenuation factor parameter of the control unit 14 is changed, and the distance between the sample and the probe is made gradually closer using the Z fine adjustment mechanism 4a, increasing the pressing force on the tip, thus breaking the tip and forming the aperture. In this embodiment also, since a relationship between the aperture diameter and the vibration attenuation factor is quantified in advance through experimentation, it is possible to form an aperture having any diameter by setting the vibration attenuation factor.

In this embodiment, a vibration attenuation factor has been used as a parameter for controlling a distance between the probe and the sample, but it is also possible to consider a method of performing control using a variation in phase.

A control method using a dynamic mode AFMM can also be applied to a straight type optical fiber probe.

Figure 3:
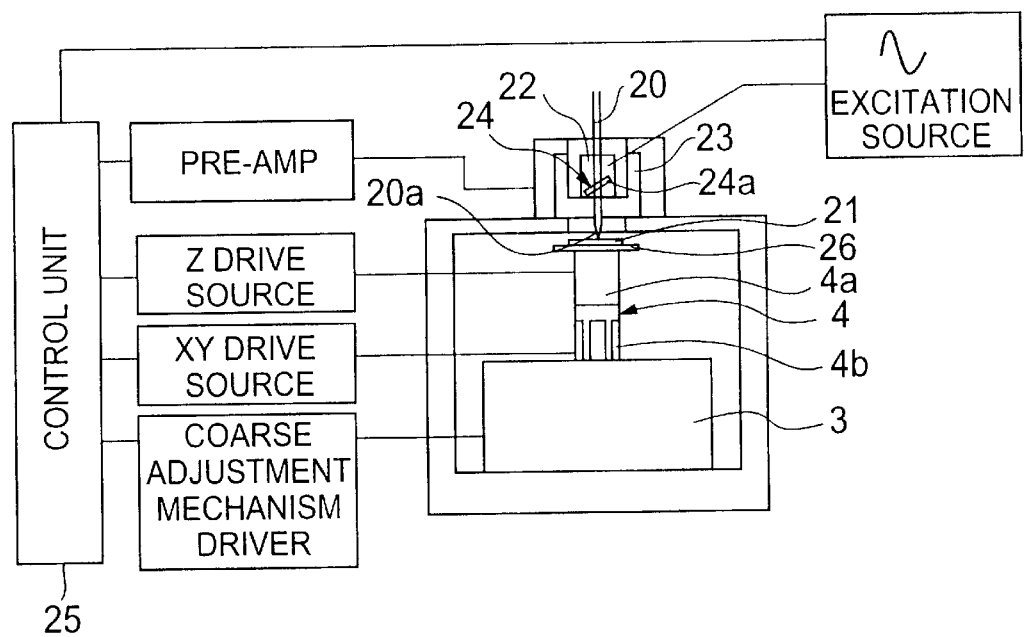
FIG. 3 is a schematic diagram of an apparatus for forming an aperture in a tip of a straight type optical fiber probe using shear force regulation, being a third embodiment of the present invention.

FIG. 3 is a schematic diagram of an apparatus for forming an aperture in a tip of a straight type optical fiber probe using shear force regulation, being a third embodiment of the present invention.

This apparatus comprises a coarse adjustment mechanism 3 for bringing a sample 21 close to a probe 20, a Z fine adjustment mechanism 4a for finely adjusting a distance between the sample 21 and the probe 20, an XY fine adjustment mechanism 4b for scanning the sample 21 within a two-dimensional plane, a sample holder 26 for mounting the sample, a probe holder 23 to which a piezoelectric element 22 for probe excitation is attached, a vibration detection unit 24 for measuring an amount of vibration of the probe 20, and a control unit 25 for carrying out control of the overall system. Here, the coarse adjustment mechanism 3 uses a method for driving a feed screw with a motor, while the XY and Z fine adjustment mechanisms use a cylindrical piezoelectric element 4. Also, the vibration detection means has the probe 20 fastened to piezoelectric body 24a, and employs a method for measuring vibration amount by converting variation in force acting on the probe tip to variation in an amount of electrical charge of the piezoelectric body.

In a state where an aperture section 20a of an optical fiber probe is pre-coated with an Al metallic film and is almost completely blocked up, only a pin-hole that is smaller than the finally required fine aperture diameter (here $\phi$50 nm) remains.

Using this apparatus, the probe 20 is vibrated at close to the resonant frequency within a plane parallel to the sample, and the sample 21 is brought closer to the probe 20 by the coarse adjustment mechanism 3 while monitoring an amount of vibration. The sample 21 is brought up to a region where a shear force acts between the sample 21 and the probe 20, and if the vibration is attenuated to a previously set amount the coarse adjustment mechanism 3 is stopped, and feedback is carried out using the Z fine adjustment mechanism 4a so that this amount of vibration becomes constant. A pressing force and shear force received by the probe tip at an initial value for this amount of vibration are forces that will not break the tip. After that, a vibration attenuation factor parameter of the control unit is changed, and the distance between the sample and the probe is made gradually closer using the Z fine adjustment mechanism 4a, increasing the pressing force and the shear force on the tip, thus breaking the tip and forming the aperture. In this embodiment also, since a relationship between the aperture diameter and the vibration attenuation factor is quantified in advance through experimentation, it is possible to form an aperture having any diameter by setting the vibration attenuation factor.

In this embodiment, a vibration attenuation factor has been used as a parameter for controlling a distance between the probe and the sample, but it is also possible to consider a method of performing control using a variation in phase.

As the method for detecting vibration amount, besides the piezoelectric method it is also possible to use a method for optically measuring vibration amount using a laser.

Also, shear force control is not limited to a straight type optical fiber probe, and can also be applied to a cantilever having a microscopic aperture or a bent type optical fiber probe. In such cases, the cantilever or bent type probe is twistingly vibrated so that the tip section of the cantilever or probe tip vibrates within a plane parallel to the sample. At this time, an amount of variation in the twisting angle is monitored using a force on the probe tip. This twisting angle corresponds to vibration amount in the case where a straight type optical fiber probe is used, and enables control of the distance between the probe and the sample. Accordingly, it is possible to form a microscopic aperture in the probe tip using the same principal as in the third embodiment.

Figure 4:
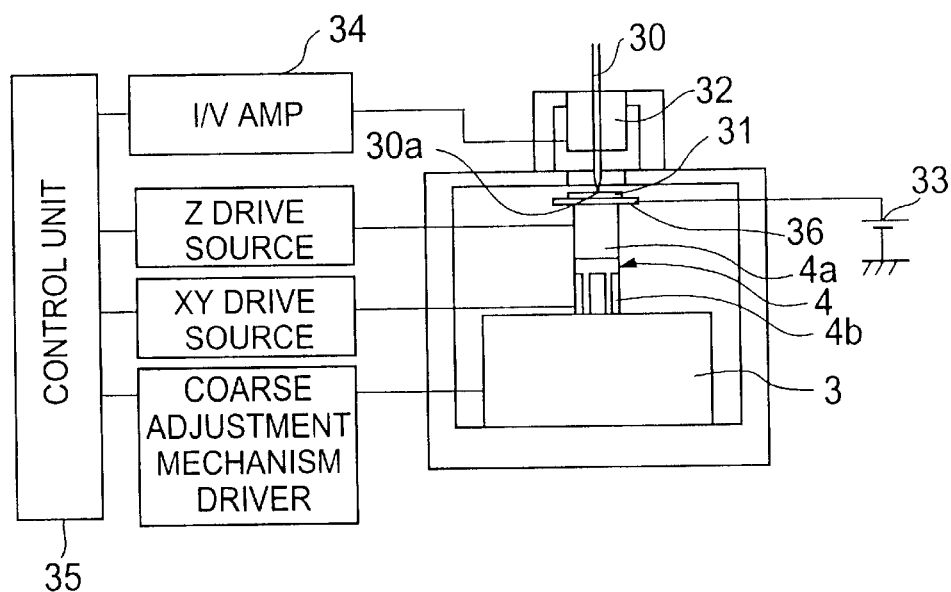
FIG. 4 is a schematic diagram of an apparatus for forming an aperture in a tip of a straight type optical fiber probe using STM regulation, being a fourth embodiment of the present invention.

FIG. 4 is a schematic diagram of an apparatus for forming an aperture in a tip of a straight type optical fiber probe using STM regulation, being a fourth embodiment of the present invention.

This apparatus comprises a coarse adjustment mechanism 3 for bringing a conductive sample 31 close to a probe 30, a Z fine adjustment mechanism 4a for finely adjusting a distance between the sample 31 and the probe 30, an XY fine adjustment mechanism 4b for scanning the sample 31 within a two-dimensional plane, a conductive sample holder 36 for fixing the conductive sample 31, a probe holder 32 for fixing the sample, a voltage applying unit 33 for applying a bias voltage between the probe 30 and the sample 31, current measuring means 34 for measuring a tunnel current flowing between the probe 30 and the sample 31, and a control unit 35 for carrying out control of the overall system. Here, the coarse adjustment mechanism 3 uses a method for driving a feed screw with a motor, while the XY and Z fine adjustment mechanisms use a cylindrical piezoelectric element 4. Also, the sample 31 is a Au coated glass to give a sample having conductivity, and the bias voltage is applied to the sample holder through the sample holder 36.

The entire probe body, including the probe tip section, is coated in an Au metallic film, and the aperture section is almost completely blocked up. Since the probe itself is also covered with the conductive film, a tunnel current flows between the probe 30 and the sample 31 to bring the two together.

Using this apparatus, the sample 31 is brought closer to the probe 30 by the coarse adjustment mechanism 3 while monitoring an amount of current. The sample 31 is brought up to a region where a tunnel current flows between the sample 31 and the probe 30, and if the tunnel current value becomes a previously set amount the coarse adjustment mechanism 3 is stopped, and feedback is carried out using the Z fine adjustment mechanism 4a so that this tunnel current value becomes constant. A pressing force received by the probe tip at an initial value for this tunnel current is a force that will not break the tip. After that, a tunnel current parameter of the control unit 35 is changed, and the distance between the sample 31 and the probe 30 is made gradually closer using the Z fine adjustment mechanism 4a, increasing the pressing force on the tip, thus breaking the tip and forming the aperture 30a. In this embodiment also, since a relationship between the aperture diameter and the tunnel current value is quantified in advance through experimentation, it is possible to form an aperture having any diameter by setting the tunnel current value.

A control method using STM can also be applied to a bent type optical fiber probe or a cantilever having a microscopic aperture having a conductive metal film formed on a tip.

Figure 5:
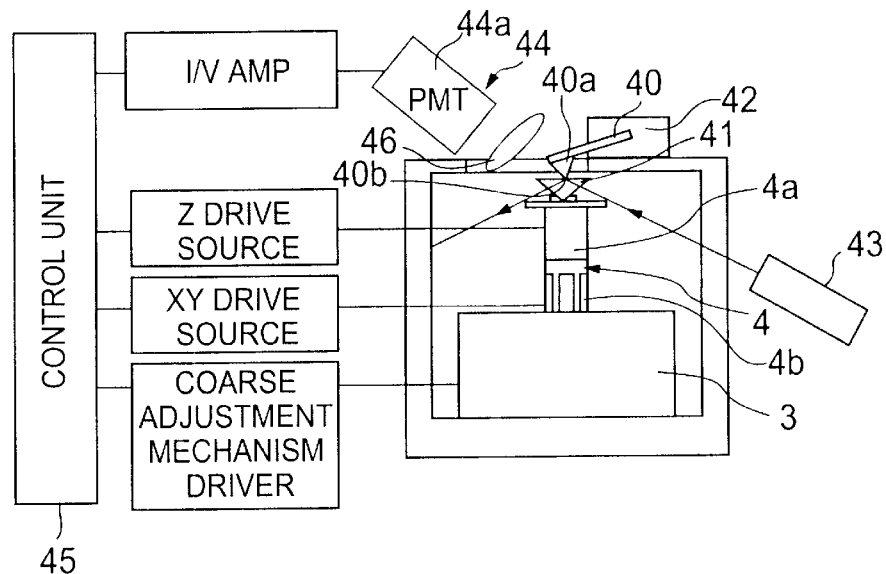
FIG. 5 is a schematic diagram of an apparatus for forming an aperture in a tip of a cantilever having a microscopic aperture using evanescent light regulation, being a fifth embodiment of the present invention.

FIG. 5 is a schematic diagram of an apparatus for forming an aperture in a tip of a cantilever having a microscopic aperture using evanescent light regulation, being a fifth embodiment of the present invention.

This apparatus comprises a coarse adjustment mechanism 3 for bringing a prism 41 used as a sample close to a probe 40a, a Z fine adjustment mechanism 4a for finely adjusting a distance between the prism 41 and the probe 40a, an XY fine adjustment mechanism 4b for scanning the prism 41 within a two-dimensional plane, a cantilever holder 42 for fixing a cantilever 40, a laser optical system constructed so as to irradiate laser light under total reflection conditions from the underneath of the prism 41, a light detection unit 44 for detecting the intensity of light scattered at the cantilever tip, and a control unit 45 for carrying out control of the overall system. Here, the coarse adjustment mechanism 3 uses a method for driving a feed screw with a motor, the XY and Z fine adjustment mechanisms use a cylindrical piezoelectric element 4, and the light detection unit 44 uses a photomultiplier 44a.

The cantilever having a microscopic aperture 40 has a through hole formed in advance in the probe section using FIB processing, but the tip aperture section 4b is initially blocked up by coating with an Al metallic film.

Using this apparatus, when forming the aperture, a laser beam is irradiated under total reflection conditions from underneath the prism 41 and an evanescent field is formed on the surface of the prism. Next, the prism 41 is brought closer to the probe 40a by the coarse adjustment mechanism 3. If the probe 40a is brought up to an evanescent region evanescent light is scattered at the probe tip and converted to propagation light. This propagation light is converged by a converging lens 46 provided diagonally above the regions where the evanescent field is generated and light intensity is measured using a photomultiplier 44a. Since evanescent light intensity depends on the distance from the prism surface, if feedback is carried until the intensity of this scattered light becomes constant, it is possible to regulate the distance between the probe and the prism surface. If the scattered light intensity becomes a value set in advance, the coarse adjustment mechanism 3 is stopped, and feedback is carried out using the Z fine adjustment mechanism 4a so that this scattered light intensity becomes constant. A pressing force received by the probe tip at an initial value for this scattered light intensity is a force that will not break the tip. After that, a scattered light intensity parameter of the control unit is changed, and the distance between the probe 40a and the prism 41 is made gradually closer using the Z fine adjustment mechanism 4a, increasing the pressing force on the tip, thus breaking the tip and forming the aperture. In this embodiment also, since a relationship between the aperture diameter and the scattered light intensity is quantified in advance through experimentation, it is possible to form an aperture having any diameter by setting the scattered light intensity.

Control using evanescent light can also be applied to a bent type optical fiber probe or a straight type optical fiber probe.

It is also possible to consider a method in which scattered light detection is performed by converging light that has been converged at the probe tip at the probe aperture, and detecting the intensity of light propagated through the optical fiber at the end of the optical fiber.

Figure 6:
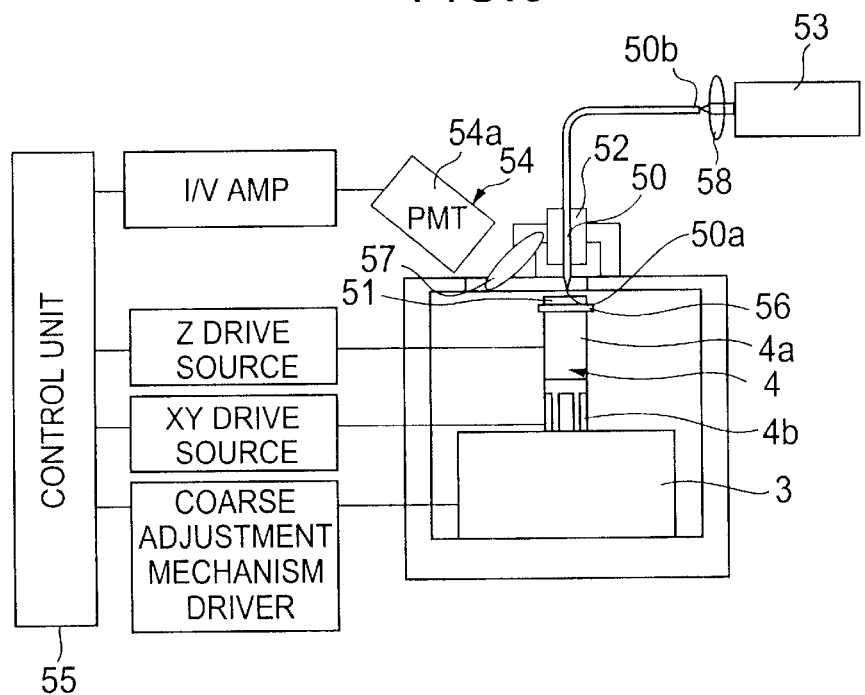
FIG. 6 is a schematic diagram of an apparatus for forming an aperture in a tip of a straight type optical fiber probe using evanescent light regulation, being a sixth embodiment of the present invention.

FIG. 6 is a schematic diagram of an apparatus for forming an aperture in a tip of a straight type optical fiber probe using evanescent light regulation, being a sixth embodiment of the present invention.

This apparatus comprises a coarse adjustment mechanism 3 for bringing a sample 51 close to a probe 50, a Z fine adjustment mechanism 4a for finely adjusting a distance between the sample 51 and the probe 50, an XY fine adjustment mechanism 4b for scanning the sample 51 within a two-dimensional plane, a sample holder 56 for mounting a sample, a probe holder 52 for fixing the probe 50, a laser optical system 53 for irradiating laser light to an optical fiber probe, a light detection unit 54 for detecting the intensity of scattered light, and a control unit 55 for carrying out control of the overall system. Here, the coarse adjustment mechanism 3 uses a method for driving a feed screw with a motor, the XY and Z fine adjustment mechanisms use a cylindrical piezoelectric element 4, and the light detection unit 54 uses a photomultiplier 54a.

In a state where an aperture section 50a of the optical fiber probe is pre-coated with an Al metallic film and is almost completely blocked up, only a pin-hole that is smaller than the finally required fine aperture diameter (here $\phi$50 nm) remains.

Using this apparatus, when forming the aperture, a laser beam is converged by a converging lens 58, is incoming from an end 50b of the optical fiber probe, and an evanescent field is formed in the vicinity of a microscopic aperture 50a provided in the probe tip. Next, the sample 51 is brought closer to the probe 50 by the coarse adjustment mechanism 3. If the sample 51 approached the tip of the probe 50, evanescent light is scattered at the sample surface and converted to propagation light. This propagation light is converged by a converging lens 57 provided diagonally above the probe tip, and light intensity is measured using the photomultiplier 54a. Since evanescent light intensity depends on the distance from the sample surface, if feedback is carried until the intensity of this scattered light becomes constant, it is possible to regulate the distance between the probe and the sample surface. If the scattered light intensity becomes a value set in advance, the coarse adjustment mechanism is stopped, and feedback is carried out using the Z fine adjustment mechanism 4a so that this scattered light intensity becomes constant. A pressing force received by the probe tip at an initial value for this scattered light intensity is a force that will not break the tip. After that, a scattered light intensity parameter of the control unit is changed, and the distance between the probe 50 and the sample 51 is made gradually closer using the Z fine adjustment mechanism 4a, increasing the pressing force on the tip, thus flaring the tip outwards and forming an aperture having a desired diameter.

In this embodiment also, since a relationship between the aperture diameter and the scattered light intensity is quantified in advance through experimentation, it is possible to form an aperture having any diameter by setting the scattered light intensity.

This method is also applicable to a bent type optical fiber probe or a cantilever having a microscopic aperture.

Figure 7:
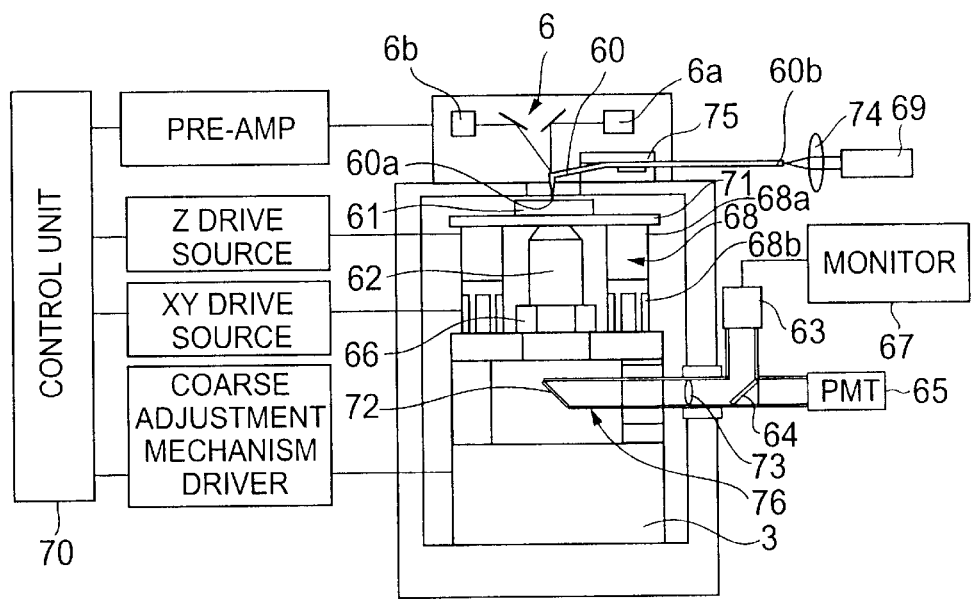
FIG. 7 is a schematic diagram of an apparatus for forming an aperture in a tip of a bent type optical fiber probe using a contact mode AFM regulation method, while estimating aperture size using light microscopy or light intensity from the aperture, being a seventh embodiment of the present invention.

FIG. 7 is a schematic diagram of an apparatus for forming an aperture in a tip of a bent type optical fiber probe using contact mode AFM regulation, while estimating aperture size using light microscopy or light intensity from the aperture, being a seventh embodiment of the present invention.

This apparatus comprises a coarse adjustment mechanism 3 for bringing a sample 61 close to a probe 60, a Z fine adjustment mechanism 68a for finely adjusting a distance between the sample 61 and the probe 60, an XY fine adjustment mechanism 68b for scanning the sample within a two-dimensional plane, a sample holder 71 for mounting the sample, a probe holder 75 for fixing the probe 60, a displacement detection unit 6 for measuring an amount of displacement of the probe, control unit 70 for controlling the overall system, and an inverting microscope 76 capable of observing a sample surface from a lower side of the sample. At this time, the sample 61 is observable by a CCD camera 63 through an optical system having an objective lens 62 of transparent glass arranged below the sample and comprising a mirror 72 totally reflecting an image of the probe tip 60a, an image lens 73 and a half mirror 64, and a light path is divided into two by the half mirror 64 giving a structure capable of measuring light intensity using a photomultiplier 65. Also, the Z fine adjustment mechanism 68a and the XY fine adjustment mechanism 68b used are made up of three cylindrical piezoelectric elements 68 arranged so as to surround the objective lens 62, and the sample holder 71 provided on these cylindrical piezoelectric elements is caused to move by driving them in the same direction.

Using this apparatus, light of the laser optical system 69 is converged by the converging lens 74, and is incident on the probe tip 60b. With the focal point of the objective lens 62 aligned with the sample surface by a focussing mechanism 66, the sample 61 is brought close to the probe 60 by the coarse adjustment mechanism 3, and if it reaches a region where an atomic force acts, the aperture shape is observed n a monitor 67 using the image of the CCD camera 63. At the same time, evanescent light formed at the probe tip 60a scatters at the sample surface, light that has passed through the sample 61 is converged by the objective lens 62 and light intensity is measured using the photomultiplier 65. An amount of bending of the probe at this time is measured by an optical head 6 using an optical lever method, and with the amount of bending as a parameter the amount of bending is increased further by the control unit 70 while performing feedback using the Z fine adjustment mechanism 68a, and if a pressing force of the probe tip increases the tip aperture 60a is flared outwards by plastic deformation or breakage. The aperture diameter at this time can be estimated by monitoring light leaking out from the tip using the image of the CCF camera, or by measuring light intensity the photomultiplier 65, and the bending amount is increased until an aperture of a desired diameter are obtained. This method is not limited to the case of making the bending amount a parameter, and can also be applied to other distance regulating methods. It can also be applied to a straight type optical fiber probe.

Figure 18:
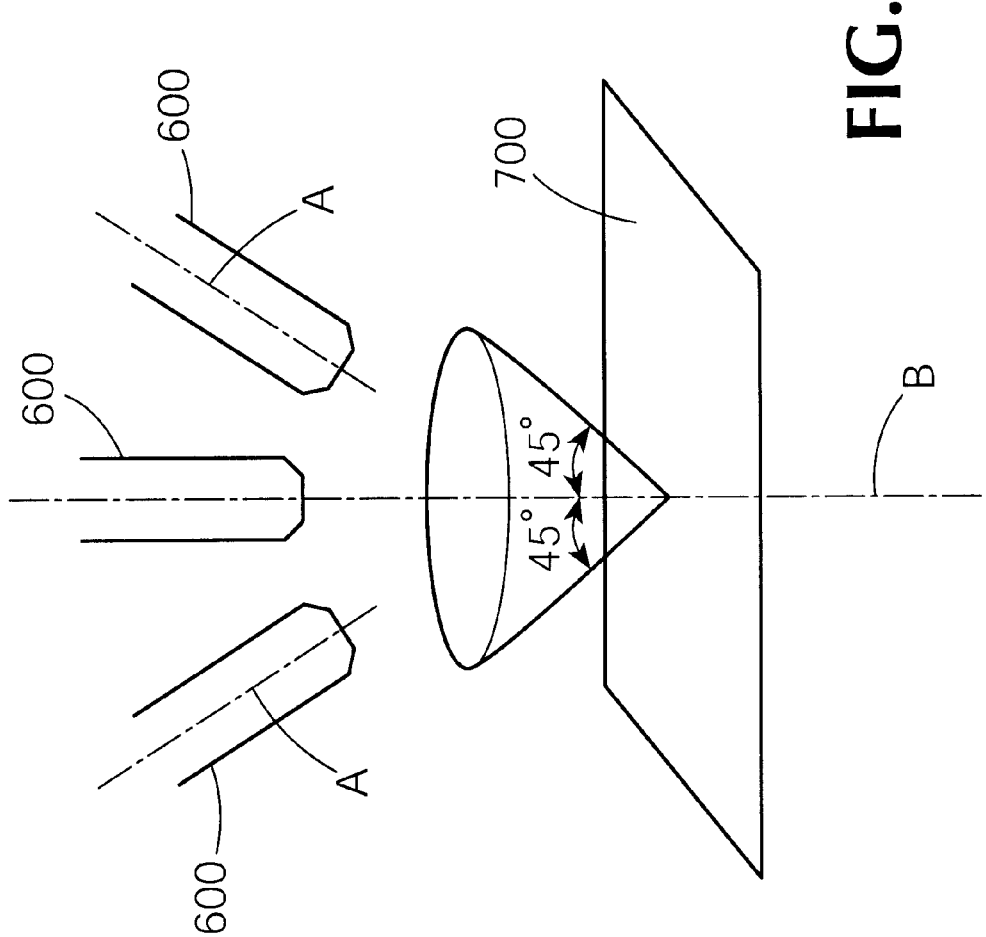
FIG. 18 is a schematic diagram showing the angular relation between a longitudinal axis of the probe tip and a vertical axis extending from the surface of the sample.

FIG. 18 is a schematic view showing a preferred angular relation between a longitudinal axis A of a probe tip 600 and a vertical axis B extending from the surface of a sample 700 in the methods of forming an aperture in the optical fiber probe according to the foregoing embodiments of the present invention. Preferably, the longitudinal axis A is inclined less than 45° from the vertical axis B.

It is also possible to make an aperture for a cantilever using the previously described methods, taking light intensity using the image from a CCD camera or a photomultiplier as a criterion. In this case, introduction of laser light involves an objective lens arranged on an upper side of the cantilever, and light is converged in an aperture opened in the cantilever from a rear surface. It is also possible to apply a method where a light waveguide is formed on the cantilever, laser light is coupled into the light waveguide at an optical fiber or an objective lens, and light is guided into the aperture.

As described above the present invention brings a probe tip and a sample close together or into contact with each other using an atomic force or a shear force acting between the probe tip of an optical fiber probe or a cantilever having a microscopic aperture, or tunnel current or evanescent light, controls a force acting on the tip with one of these physical amounts as a parameter, and forms an aperture in the optical fiber probe or cantilever having a microscopic aperture using means for subjecting the probe tip to plastic deformation or breakage using a force from the sample surface to make an aperture of a desired diameter in the tip section.

By using this type of method, it is no longer necessary to optimize vapor deposition conditions as was the case when forming an aperture through vapor deposition in the related art, and even if the type or shape of optical fiber probe or cantilever having a microscopic aperture is varied it is possible to form an aperture with good reproducibility. Also, it is possible to correct the aperture diameter after aperture formation.

Still further, in the case of forming an aperture by pressing the probe of an optical fiber probe or cantilever having a microscopic aperture against a sample, it is possible to adjust the pressing force more finely than in the related art, and problems such as the aperture diameter being too large and the shape of the aperture becoming elliptical can be alleviated, and it is possible to easily form the aperture.

What is claimed is:

1. A method of forming an aperture in an optical fiber probe, comprising the steps of:
   sharpening a tip of an optical fiber probe;
   bending a tip section of the optical fiber probe relative to a longitudinal axis thereof;
   covering a portion of the optical fiber probe at a vicinity of the tip section thereof with a metallic film;
   positioning the optical fiber probe relative to a surface of a sample so that a longitudinal axis of the tip section of the optical fiber probe is inclined at an angle less than 45° from a vertical axis extending from the surface of the sample;
   effecting relative movement between the optical fiber probe and the surface of the sample so that the optical fiber probe is disposed in a region where an atomic force acts between the optical fiber probe and the surface of the sample;
   measuring and monitoring a displacement of the optical fiber probe resulting from the atomic force acting between the tip of the optical fiber probe and the surface of the sample; and
   using a pressing force generated by the atomic force or a contact force acting between the tip of the optical fiber probe and the surface of the sample to plastically deform or break the tip section of the optical fiber probe to form an aperture in the tip section having a diameter obtained in accordance with a measured value of the displacement of the probe.

2. A method of forming an aperture in an optical fiber probe, comprising the steps of:
   sharpening a tip of an optical fiber probe;
   bending a tip section of the optical fiber probe relative to a longitudinal axis thereof;
   covering a portion of the optical fiber probe at a vicinity of the tip section thereof with a metallic film;
   positioning the optical fiber probe relative to a surface of a sample so that a longitudinal axis of the tip section of the optical fiber probe is inclined at an angle less than 45° from a vertical axis extending from the surface of the sample;
   vibrating the optical fiber probe in a vertical direction along a plane orthogonal to the surface of the sample so that the optical fiber probe is disposed in a region where an atomic force acts between the tip of the optical fiber probe and the surface of the sample;
   measuring and monitoring a vibration attenuation factor of the optical fiber probe; and
   using a pressing force generated by the atomic force or a contact force acting between the tip of the optical fiber probe and the surface of the sample to plastically deform or break the tip section of the optical fiber probe to form an aperture in the tip section having a diameter obtained in accordance with a measured value of the vibration attenuation factor of the optical fiber probe.

3. A method of forming an aperture in an optical fiber probe, comprising the steps of:
   sharpening a tip of an optical fiber probe;
   bending a tip section of the optical fiber probe relative to a longitudinal axis thereof;
   covering a portion of the optical fiber probe at a vicinity of the tip section thereof with a metallic film;
   positioning the optical fiber probe relative to a surface of a sample so that a longitudinal axis of the tip section of the optical fiber probe is inclined at an angle less than 45° from a vertical axis extending from the surface of the sample;
   vibrating the optical fiber probe in a vertical direction along a plane orthogonal to the surface of the sample so that the optical fiber probe is disposed in a region where an atomic force acts between the tip of the optical fiber probe and the surface of the sample;
   measuring and monitoring a vibrational phase of the optical fiber probe; and
   using a pressing force generated by the atomic force or a contact force acting between the tip of the optical fiber probe and the surface of the sample to plastically deform or break the tip section of the optical fiber probe to form an aperture in the tip section having a diameter obtained in accordance with a measured value of the vibrational phase of the optical fiber probe.

4. A method of forming an aperture in an optical fiber probe, comprising the steps of:
   sharpening a tip of an optical fiber probe;
   covering a portion of the optical fiber probe at a vicinity of the tip section thereof with a metallic film;
   positioning the optical fiber probe relative to a surface of a sample so that a longitudinal axis of the tip section of the optical fiber probe is inclined at an angle less than 45° from a vertical axis extending from the surface of the sample;

vibrating the optical fiber probe in a lateral direction along a plane parallel to the surface of the sample so that the optical fiber probe is disposed in a region where a shear force acts between the tip of the optical fiber probe and the surface of the sample;

measuring and monitoring a vibration phase of the optical fiber probe; and using the shear force acting between the tip of the optical fiber probe and the surface of the sample to plastically deform or break the tip section of the optical fiber probe to form an aperture in the tip section having a diameter obtained in accordance with a measured value of the vibration attenuation factor of the optical fiber probe.

5. A method of forming an aperture in an optical fiber probe, comprising the steps of:

sharpening a tip of an optical fiber probe;

covering a portion of the optical fiber probe at a vicinity of the tip section thereof with a metallic film;

positioning the optical fiber probe relative to a surface of a sample so that a longitudinal axis of the tip section of the optical fiber probe is inclined at an angle less than 45° from a vertical axis extending from the surface of the sample;

vibrating the optical fiber probe in a lateral direction along a plane parallel to the surface of the sample so that the optical fiber probe is disposed in a region where a shear force acts between the tip of the optical fiber probe and the surface of the sample;

measuring and monitoring a vibrational phase of the optical fiber probe; and using the shear force acting between the optical fiber probe and the surface of the sample to plastically deform or break the tip section of the optical fiber probe to form an aperture in the tip section having a diameter obtained in accordance with a measured value of the vibrational phase of the optical fiber probe.

6. A method of forming an aperture in an optical fiber probe, comprising the steps of:

sharpening a tip of an optical fiber probe;

bending a tip section of the optical fiber probe relative to a longitudinal axis thereof;

covering a portion of the optical fiber probe at a vicinity of the tip section thereof with a metallic film;

positioning the optical fiber probe relative to a surface of a sample so that a longitudinal axis of the tip section of the optical fiber probe is inclined at an angle less than 45° from a vertical axis extending from the surface of the sample;

vibrating the optical fiber probe in a twisting direction along a plane parallel to the surface of the sample so that the optical fiber probe is disposed in a region where a shear force acts between the tip of the optical fiber probe and the surface of the sample;

measuring and monitoring a twisting angle of the optical fiber probe; and using the shear force acting between the tip of the optical fiber probe and the surface of the sample to plastically deform or break the tip section of the optical fiber probe to form an aperture in the tip section having a diameter obtained in accordance with a measured value of the twisting angle of the optical fiber probe.

7. A method of forming an aperture in an optical fiber probe, comprising the steps of:

sharpening a tip of an optical fiber probe;

bending a tip section of the optical fiber probe relative to a longitudinal axis thereof;

covering a portion of the optical fiber probe at a vicinity of the tip section thereof with a metallic film;

positioning the optical fiber probe relative to a surface of a sample so that a longitudinal axis of the tip section of the optical fiber probe is inclined at an angle less than 45° from a vertical axis extending from the surface of the sample;

vibrating the optical fiber probe in a twisting direction along a plane orthogonal to the surface of the sample so that the optical fiber probe is disposed in a region where a shear force acts between the tip of the optical fiber probe and the surface of the sample;

measuring and monitoring a twisting phase of the optical fiber probe; and using the shear force acting between the tip of the optical fiber probe and the surface of the sample to plastically deform or break the tip section of the optical fiber probe to form an aperture in the tip section having a diameter obtained in accordance with measured value of the twisting phase of the optical fiber probe.

8. A method of forming an aperture in an optical fiber probe, comprising the steps of:

sharpening a tip of an optical fiber probe;

covering a portion of the optical fiber probe at a vicinity of the tip section thereof with a metallic film;

positioning the optical fiber probe relative to a surface of a sample so that a longitudinal axis of the tip section of the optical fiber probe is inclined at an angle less than 45° from a vertical axis extending from the surface of the sample;

applying a bias voltage between the surface of the sample and the metallic film formed on the optical fiber probe;

disposing the optical fiber probe in a region where a tunnel current flows between the optical fiber probe and the surface of the sample and an atomic force acts on the tip section of the optical fiber probe;

measuring and monitoring the tunnel current flowing between the optical fiber probe and the surface of the sample; and using a pressing force generated by the atomic force or a contact force acting on the tip section of the optical fiber probe to plastically deform or break the tip section of the optical fiber probe to form an aperture in the tip section having a diameter obtained in accordance with a measured value of the tunnel current flowing between the optical fiber probe and the surface of the sample.

9. A method according to claim 8; further comprising the step of bending a tip section of the optical fiber probe relative to a longitudinal axis thereof between the sharpening and covering steps.

10. A method of forming an aperture in an optical fiber probe, comprising the steps of:

sharpening a tip of an optical fiber probe;

covering a portion of the optical fiber probe at a vicinity of the tip section thereof with a metallic film;

positioning the optical fiber probe relative to a surface of a sample so that a longitudinal axis of the tip section of the optical fiber probe is inclined at an angle less than 45° from a vertical axis extending from the surface of the sample;

forming an evanescent field on the surface of the sample;

effecting relative movement between the optical fiber probe and the surface of the sample so that the optical fiber probe is disposed in a region where evanescent light scatters at the tip of the optical fiber probe and an atomic force acts on the tip section of the optical fiber probe;

measuring and monitoring the intensity of evanescent light scattered at the tip of the optical fiber probe; and using a pressing force generated by the atomic force or a contact force acting on the tip section of the optical fiber probe to plastically deform or break the tip section of the optical fiber probe to form an aperture in the tip section having a diameter obtained in accordance with a measured value of the intensity of scattered evanescent light.

11. A method according to claim 10; further comprising the step of bending a tip section of the optical fiber probe relative to a longitudinal axis thereof between the sharpening and covering steps.

12. A method of forming an aperture in an optical fiber probe, comprising the steps of:

sharpening a tip of an optical fiber probe having a waveguide section;

covering a portion of the optical fiber probe at a vicinity of the tip section thereof with a metallic film;

positioning the optical fiber probe relative to a surface of a sample so that a longitudinal axis of the tip section of the optical fiber probe is inclined at an angle less than 45° from a vertical axis extending from the surface of the sample;

introducing light into the waveguide section of the optical fiber probe to form an evanescent field at the tip of the optical fiber probe;

effecting relative movement between the optical fiber probe and the surface of the sample so that the optical fiber probe is disposed in a region where evanescent light scatters at the surface of the sample and an atomic force acts on the tip section of the optical fiber probe;

measuring and monitoring the intensity of evanescent light scattered at the surface of the sample; and using a pressing force generated by the atomic force or a contact force acting on the tip section of the optical fiber probe to plastically deform or break the tip section of the optical fiber probe to form an aperture in the tip section of the optical fiber probe having a diameter obtained in accordance with a measured value of the intensity of scattered evanescent light.

13. A method according to claim 12; further comprising the step of bending a tip section of the optical fiber probe relative to a longitudinal axis thereof between the forming and covering steps.

14. A method as in any one of claims 1–13; further comprising the step of forming in the tip of the optical fiber probe before the sharpening and covering steps an aperture having a diameter smaller than a given diameter; and wherein the diameter of the aperture formed in the using step is equal to the given diameter.

15. An optical fiber probe having an aperture formed according to the method as in any one of claims 1–13.

16. A method of forming an aperture in a cantilever, comprising the steps of:

providing a cantilever having a probe at a free end thereof;

covering a portion of the probe at a vicinity of a tip thereof with a metallic film;

positioning the cantilever relative to a surface of a sample so that an axis orthogonal to a longitudinal axis of the cantilever is inclined at an angle less than 45° from a vertical axis extending from the surface of the sample;

effecting relative movement between the cantilever and the surface of the sample so that the cantilever is disposed in a region where an atomic force acts between the tip of the probe and the surface of the sample;

measuring and monitoring a displacement of the cantilever resulting from the atomic force acting between the tip of the probe and the surface of the sample; and using a pressing force generated by the atomic force or a contact force acting between the tip of the probe and the surface of the sample to plastically deform or break the tip of the probe to form an aperture in the tip having a diameter obtained in accordance with a measured value of the displacement of the cantilever.

17. A method of forming an aperture in a cantilever, comprising the steps of:

providing a cantilever having a probe at a free end thereof;

covering a portion of the probe at a vicinity of a tip thereof with a metallic film;

positioning the cantilever relative to a surface of a sample so that an axis orthogonal to a longitudinal axis of the cantilever is inclined at an angle less than 45° from a vertical axis extending from the surface of the sample;

vibrating the cantilever in a vertical direction along a plane orthogonal to the surface of the sample so that the cantilever is disposed in a region where an atomic force acts between the tip of the probe and the surface of the sample;

measuring and monitoring a vibration attenuation factor of the cantilever; and using a pressing force generated by the atomic force or a contact force acting between the tip of the probe and the surface of the sample to plastically deform or break the tip of the probe to form an aperture in the tip having a diameter obtained in accordance with a measured value of the vibration attenuation factor of the cantilever.

18. A method of forming an aperture in a cantilever, comprising the steps of:

providing a cantilever having a probe at a free end thereof;

covering a portion of the probe at a vicinity of a tip thereof with a metallic film;

positioning the cantilever relative to a surface of a sample so that an axis orthogonal to a longitudinal axis of the cantilever is inclined at an angle less than 45° from a vertical axis extending from the surface of the sample;

vibrating the cantilever in a vertical direction along a plane orthogonal to the surface of the sample so that the cantilever is disposed in a region where an atomic force acts between the tip of the probe and the surface of the sample;

measuring and monitoring a phase of the cantilever; and using a pressing force generated by the atomic force or a contact force acting between the tip of the probe and the surface of the sample to plastically deform or break the tip of the probe to form an aperture in the tip having a diameter obtained in accordance with a measured value of the phase of the cantilever.

19. A method of forming an aperture in a cantilever, comprising the steps of:

providing a cantilever having a probe at a free end thereof;

covering a portion of the probe at a vicinity of a tip thereof with a metallic film;

positioning the cantilever relative to a surface of a sample so that an axis orthogonal to a longitudinal axis of the cantilever is inclined at an angle less than 45° from a vertical axis extending from the surface of the sample;

vibrating the cantilever in a twisting direction along a plane parallel to the surface of the sample so that the probe is disposed in a region where a shear force acts between the tip of the probe and the surface of the sample;

measuring and monitoring a twisting angle of the cantilever; and using the shear force acting between the tip of the probe and the surface of the sample to plastically deform or break the tip of the probe to form an aperture in the tip having a diameter obtained in accordance with a measured value of the twisting angle of the cantilever.

20. A method of forming an aperture in a cantilever, comprising the steps of:

providing a cantilever having a prove at a free end thereof;

covering a portion of the probe at a vicinity of a tip thereof with a metallic film;

positioning the cantilever relative to a surface of a sample so that an axis orthogonal to a longitudinal axis of the cantilever is inclined at an angle less than 45° from a vertical axis extending from the surface of the sample;

vibrating the cantilever in a twisting direction along a plane orthogonal to the surface of the sample so that the probe is disposed in a region where a shear force acts between the tip of the probe and the surface of the sample;

measuring and monitoring a phase of the cantilever; and using the shear force acting between the tip of the probe and the surface of the sample to plastically deform or break the tip of the probe to form an aperture in the tip having a diameter obtained in accordance with a measured value of the phase of the cantilever.

21. A method of forming an aperture in a cantilever, comprising the steps of:

providing a cantilever having a probe at a free end thereof;

covering a portion of the probe at a vicinity of a tip thereof with a metallic film;

positioning the cantilever relative to a surface of a sample so that an axis orthogonal to a longitudinal axis of the tip of the probe is inclined at an angle less than 45° from a vertical axis extending from the surface of the sample;

applying a bias voltage between the surface of the sample and the metallic film formed on the probe;

disposing the cantilever in a region where a tunnel current flows between a tip of the probe and the surface of the sample and an atomic force acts on the tip of the probe;

measuring and monitoring the tunnel current flowing between the tip of the probe and the surface of the sample; and using a pressing force generated by the atomic force or a contact force acting on the tip of the probe to plastically deform or break the tip of the probe to form an aperture in the tip having a diameter obtained in accordance with a measured value of the tunnel current flowing between the tip of the probe and the surface of the sample.

22. A method of forming an aperture in a cantilever, comprising the steps of:

providing a cantilever having a probe at a free end thereof;

covering a portion of the probe at a vicinity of a tip thereof with a metallic film;

positioning the cantilever relative to a surface of a sample so that an axis orthogonal to a longitudinal axis of the probe is inclined at an angle less than 45° from a vertical axis extending from the surface of the sample;

forming an evanescent field on the surface of the sample;

effecting relative movement between the cantilever and the surface of the sample so that the cantilever is disposed in a region where evanescent light scatters at the tip of the probe and an atomic force acts on the tip of the probe;

measuring and monitoring the intensity of evanescent light scattered at the tip of the probe; and using a pressing force generated by the atomic force or a contact force acting on the tip of the probe to plastically deform or break the tip of the probe to form an aperture in the tip having a diameter obtained in accordance with a measured value of the intensity of scattered evanescent light.

23. A method of forming an aperture in a cantilever, comprising the steps of:

providing a cantilever having a probe at a free end thereof;

covering a portion of the probe at a vicinity of a tip thereof with a metallic film;

positioning the cantilever relative to a surface of a sample so that an axis orthogonal to a longitudinal axis of the tip of the probe is inclined at an angle less than 45° from a vertical axis extending from the surface of the sample;

introducing light into a waveguide section of the probe to form an evanescent field at the tip of the probe;

effecting relative movement between the cantilever and the surface of the sample so that the cantilever is disposed in a region where evanescent light scatters at the surface of the sample and an atomic force acts on the tip of the probe;

measuring and monitoring the intensity of evanescent light scattered at the surface of the sample; and using a pressing force generated by the atomic force or a contact force acting on the tip of the probe to plastically deform or break the tip of the probe to form an aperture in the tip of the probe having a diameter obtained in accordance with a measured value of the intensity of scattered evanescent light.

24. A method as in any one of claims 16–23; further comprising the step of forming in the tip of the optical fiber probe before the sharpening and covering steps an aperture having a diameter smaller than a given diameter; and wherein the diameter of the aperture formed in the using step is equal to the given diameter.

25. A method as in any one of claims 16–23; wherein the forming step further comprises forming a waveguide section in the optical fiber probe for introducing light into the aperture.

26. An optical fiber probe having an aperture formed according to the method as in any one of claims 16–23.

27. A method as in one of claims 16—23; wherein the forming step further comprises forming a hole through the optical fiber probe along the longitudinal axis thereof.

* * * * *